July 24, 1956
C. H. LARISCH
2,756,015
STABILIZED SHOCK MOUNTING
Filed Jan. 8, 1954
Fig. I.
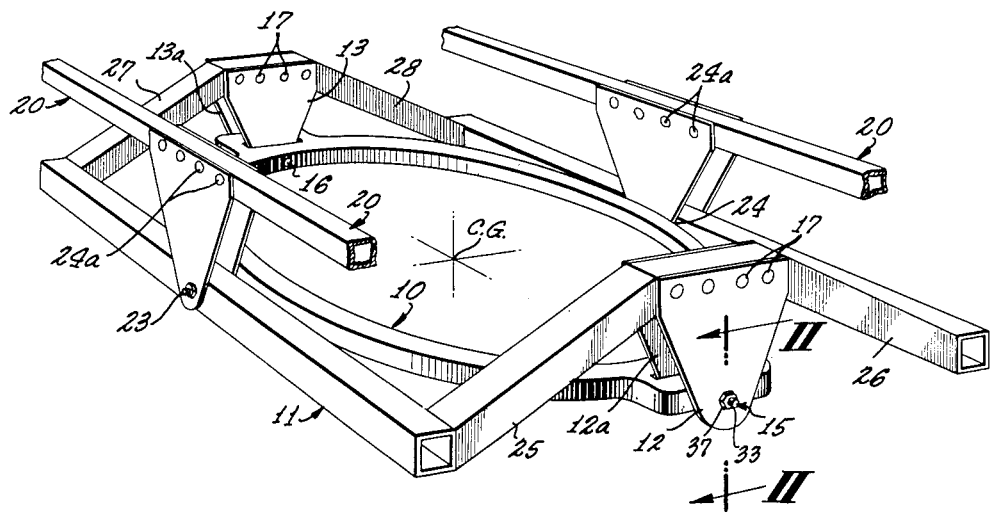
Fig. II.
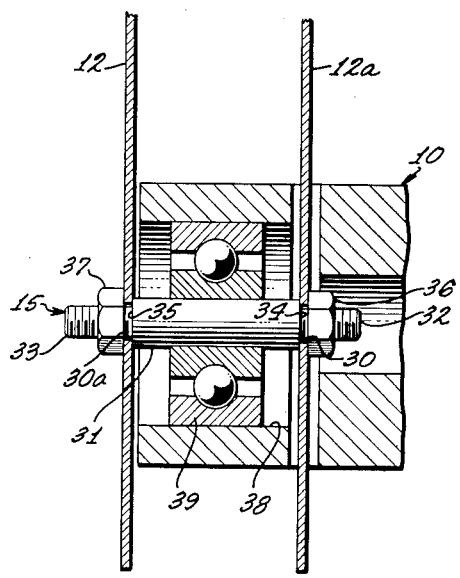
CLIFFORD H. LARISCH,
INVENTOR.
BY *Lyon & Lyon*
ATTORNEY.

United States Patent Office 2,756,015
Patented July 24, 1956

2,756,015

STABILIZED SHOCK MOUNTING

Clifford H. Larisch, Vista, Calif., assignor to Bill Jack Scientific Instrument Co., Solana Beach, Calif., a corporation of California Application January 8, 1954, Serial No. 402,844

3 Claims. (Cl. 248—358)

My invention relates to a stabilized shock mounting and finds a particularly useful application in a mounting for photo reconnaissance cameras in aircraft. It also may be used for mounting such other airborne devices as bomb sights or other equipment requiring a substantially constant vertical alignment.

Any equipment which is mounted in aircraft is subject to random vibrations which may seriously affect the accuracy of the results obtained by the equipment. This is particularly true in the case of reconnaissance photography. With the use of relatively high altitude planes for photo reconnaissance and mapping purposes, fine detail in the picture is required in order to accurately map the terrain. Excessive vibrations transmitted from the air frame to the camera will cause blurring of the picture.

One of the objects of my invention is to provide a mounting frame which eliminates substantially all vibrations which might cause blurring of the film.

I am aware that a great many shock mountings have been heretofore developed for use in mounting aerial cameras in air frames. So far as is known to me, all previous attempts to eliminate transmission of vibrations from the frame to the camera have resulted in the use of resilient rubber-like pads interspersed between the mounting frame and the air frame. Such attempts have been only partially successful. However, the use of rubber-like pads have limitations because of the change in vibration absorption properties due to extreme temperature ranges.

It is a further object of my invention to provide a mounting frame having vibration absorbing members which are independent of operating temperature ranges.

The heretofore known methods of absorbing vibrations, namely, the using of rubber-like pads, have resulted in shock mountings, the properties of which change due to aging. It is the further object of my invention to provide vibration absorbing means which are stable regardless of age.

A further disadvantage in the use of standard resilient type pads lies in the fact that such pads will transmit a limited amplitude of vibration in any one of the three dimensional planes.

It is also the object of my invention to provide vibration absorbing means which will transmit vibration in only one dimension, and which thereby substantially eliminates all linear and rotational vibration normal to the optical axis of airborne cameras.

Other and further objects and advantages will become apparent from the drawing and the specifications relative thereto.

In the drawings:

Figure I is an aperture view of a camera mounting embodying the principles of my invention.

Figure II is a sectional view taken on the line II—II of Figure I.

Referring more specifically to the drawing, I have provided an inner gimbal frame or ring 10 into which a camera is directly mounted by any suitable means. It will be understood that the inner gimbal ring 10 can also include an azimuth correction ring for proper alignment of the camera. Such correction ring is not shown because it forms no part of the invention and is standard equipment. The inner gimbal ring is secured to an outer frame, designated generally 11, which is the substantial equivalence of an outer gimbal ring, by means of diametrically disposed pairs of leaf springs 12 and 12a and 13 and 13a. It will be understood that the gimbal ring 10 is pivotally secured to the outer frame 11 by means of suitable bearing connections 15 and 16, which will be described in more detail later. The leaf springs are secured to the frame 11 by means of any suitable fastening means, such as rivets 17, it being understood that the leaf springs do not move with respect to the frame 11.

The frame 11 is secured to the air frame, designated generally 20, by means of diametrically disposed pairs of leaf springs 21 and 21a and 22 and 22a. It also will be understood that the respective leaf springs are pivotally secured to the frame 11 by means of suitable bearing connections 23 and 24, similar in detail to bearing 15; and, also, that the respective leaf springs are immovably secured to the frame 20 by such means as rivets 24a.

The frame 11 includes oppositely disposed, upwardly extending members 25, 26, 27 and 28. It will be readily understood by those skilled in the art that the pivot points 15, 16, 23 and 24 must lie in a common plane which is also common to the center of gravity of the camera, in order to avoid a pendulum action. This is particularly true where gyroscope stabilizing means is included in the assembly.

I wish to point out at this time that in the event it is desired to employ the principles of my invention as a shock mounting, separate and apart from a gyro-stabilized mounting, the upward extension of the members 25, 26, 27 and 28 is not necessary. In other words, these members all can lie in a common plane, common to the entire frame 11.

Referring to Figure II, it will be noted that the springs 12 and 12a are formed with apertures 30 and 30a, which are adapted to receive a connecting shaft 31. The connecting shaft 31 is formed with reduced end portions 32 and 33, thereby defining shoulders 34 and 35. The shoulders 34 and 35 cooperate with retaining nuts 36 and 37 to hold the leaf springs 12 and 12a.

The frame 10 is formed with an aperture 38, adapted to receive a ball bearing 39. The ball bearing also supports the shaft 31.

Random vibrations present in the air frame in all three dimensions can be transmitted to the frame 11 by means of the leaf springs 21, 21a and 22, 22a, only in a plane common to the plane of the spring. Vibrations in the frame 11 can be transmitted to the inner gimbal ring 10 only in a plane common to the leaf springs 12, 12a and 13, 13a. It will be readily seen that all vibrations normal to the axis of the camera, therefore, will be damped out because of this no-plane normal to the axis of the camera, which is common to both sets of leaf springs.

It also should be understood that only one leaf spring is necessary at each of the suspension points. However, I prefer to use the construction illustrated because it permits the use of a thinner material, thereby giving greater flexibility with the same strength.

I claim:

1. A vibration-proof stabilized mounting device, comprising a plurality of depending parallel leaf springs, each adapted to be secured at its upper end to one of a pair of spaced frame members and having the other end free, an outer gimbal frame having opposite sides pivotally secured to the free ends of said leaf springs, said outer gimbal frame having upwardly extended end members, a plurality of depending parallel leaf springs secured to said upwardly extended members, each of said second mentioned leaf springs having a free end lying in vertical planes perpendicular to the planes of said first mentioned leaf springs, and an inner gimbal frame pivotally secured to the free ends of said second mentioned leaf springs, the pivot axes of said inner and outer gimbal frames lying in a common horizontal plane and at right angles to each other.

2. A vibration-proof stabilized mounting device, comprising a plurality of depending parallel leaf springs that are resilient in one direction only, each being adapted to be secured at its upper end to one of a pair of spaced frame members and having the other end free, an outer gimbal frame having opposite sides pivotally secured to the free ends of said leaf springs, said outer gimbal frame having upwardly extended end members, a second plurality of depending parallel leaf springs that are resilient in one direction only and which are secured to said upwardly extended members, each of said second mentioned leaf springs having a free end lying in vertical planes perpendicular to the planes of said first mentioned leaf springs, and an inner gimbal frame pivotally secured to the free ends of said second mentioned leaf springs, the pivot axes of said inner and outer gimbal frames lying in a common horizontal plane and at right angles to each other.

3. A vibration-proof stabilized mounting device, comprising a plurality of depending parallel leaf springs that are resilient in one direction only, each adapted to be secured at its upper end to one of a pair of spaced frame members and having the other end free, an outer gimbal frame having opposite sides pivotally secured to the free ends of said leaf springs, said outer gimbal frame having end members, a second plurality of depending parallel leaf springs that are resilient in one direction only and which are secured to said end members, each of said second mentioned leaf springs having a free end lying in vertical planes perpendicular to the planes of said first mentioned leaf springs, and an inner gimbal frame pivotally secured to the free ends of said second mentioned leaf springs, the pivot axes of said inner and outer gimbal frames lying in a common horizontal plane and at right angles to each other.

References Cited in the file of this patent

FOREIGN PATENTS 312,808   Great Britain _____ June 6, 1929